United States Patent

[11] 3,610,374

[72] Inventor David J. Troyer
 South Bend, Ind.
[21] Appl. No. 848,424
[22] Filed Aug. 8, 1969
[45] Patented Oct. 5, 1971
[73] Assignee The Bendix Corporation

[54] ADJUSTER MECHANISM FOR WEDGE BRAKES
 12 Claims, 5 Drawing Figs.
[52] U.S. Cl. .................................................. 188/79.5 GE,
 188/196 BA
[51] Int. Cl. ..................................................... F16d 51/52,
 F16d 65/56
[50] Field of Search ......................................... 188/79.5 P,
 79.5 GE, 196 R

[56] References Cited
 UNITED STATES PATENTS
 3,334,713 8/1967 Russell .......................... 188/196 P
 3,361,232 1/1968 Engle ............................. 188/196 P Primary Examiner—Duane A. Reger
Attorneys—C. F. Arens and Plante, Arens, Hartz, Hix and Smith ABSTRACT: An adjuster mechanism for wedge brakes includes a plunger assembly that carries an adjuster nut coaxially receiving an adjuster screw. A flange circumscribes the adjuster nut and is releasably connected thereto by a pair of sprag springs disposed in corresponding recesses in the flange. An annular retainer member is secured to the housing, and has a portion that overlays the path of axial travel of the flange. Upon actuation of the brake, the flange moves axially with the plunger assembly until it contacts the retainer, whereupon the sprag springs allow the adjuster nut to move axially with respect to the flange. Upon return movement of the plunger, the driving pawl rotates the flange which, due to the interconnection between the flange and the adjuster nut, rotates the latter to extend the same from the adjuster screw. However, should "kickback" forces lock the screw and the nut against relative rotation, the sprag spring permits the flange to turn with respect to the nut, thereby preventing destruction of the apparatus.

INVENTOR.
DAVID J. TROYER
BY
Plante, Arens, Hartz, Hix and Smith
ATTORNEYS

INVENTOR.
DAVID J. TROYER
BY
*Plante, Arens, Hartz, Hix and Smith*
ATTORNEYS 3,610,374

ADJUSTER MECHANISM FOR WEDGE BRAKES

BACKGROUND OF THE INVENTION

This invention relates to an improved adjusting mechanism and seal assembly for wedge-actuated drum brakes.

Adjusting mechanisms that move the brake shoe closer to the drum to compensate for lining wear have been proposed for wedge brakes before. A common design provides a plunger assembly including a pair of threadedly engaged members that extent from a housing when actuated by the wedge to apply the brakes. A pawl and ratchet assembly actuated by return movement of the plunger incrementally rotates one of the members to extend the latter with respect to the other member to thereby move the shoe closer to the drum. However, under certain conditions "kickback" forces acting through the shoe preclude relative rotation between the members. Therefore, mechanism must be provided between the ratchet and the members to permit relative rotation therebetween when the members are locked together, but the mechanism must normally maintain the ratchet in engagement with the member so that the latter may be rotated. A seal must also be provided between the plunger assembly and the housing to prevent contaminants from interfering with the operation of the adjusting mechanism.

SUMMARY

Therefore, an important object of my present invention is to provide an adjuster that compensates for "kickback" forces more efficiently than existing designs.

Another important object of my invention is to provide an improved seal and an improved sealing surface between the housing and the plunger assembly.

Another important object of the present invention is to completely enclose the ratchet and drive means within the chamber protected by the seal.

Yet another important object of my invention is to substantially reduce manufacturing problems by providing a more simple adjuster design than that available on prior art devices.

IN THE DRAWINGS

DETAILED DESCRIPTION

Figure 1:
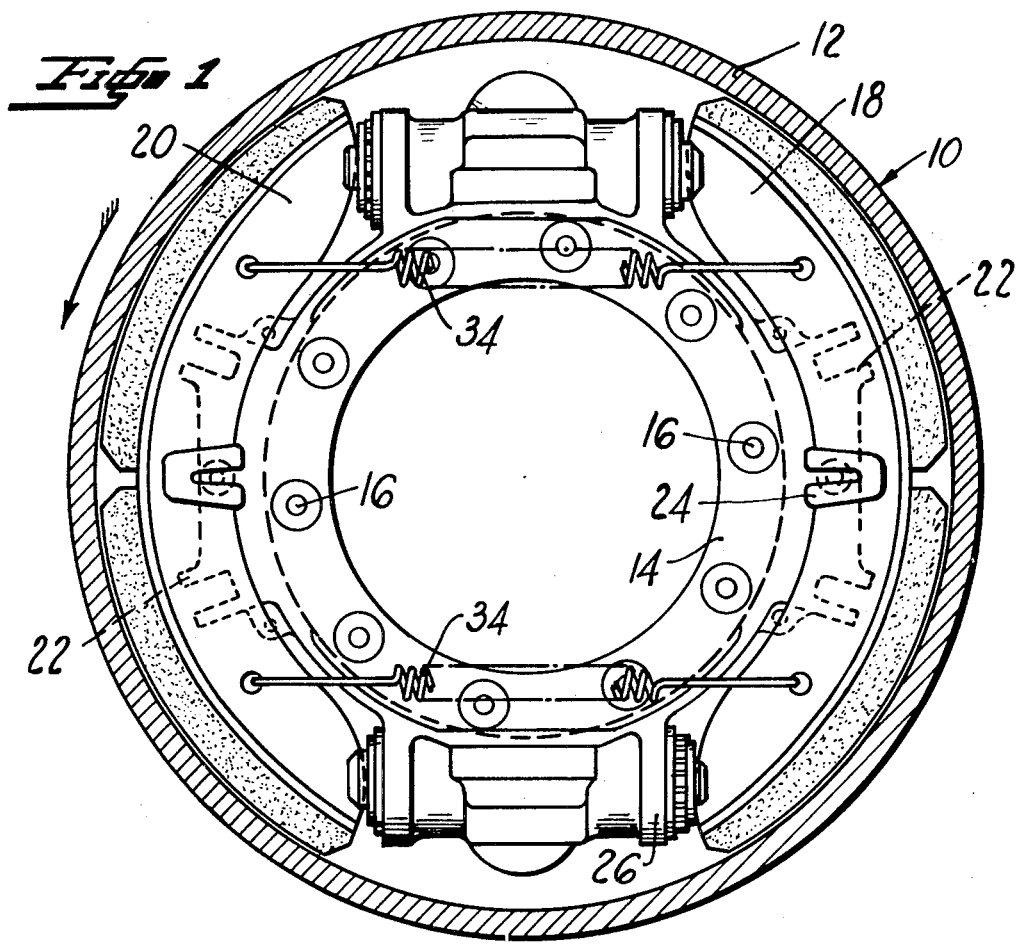
FIG. 1 is a front elevational view of a brake assembly.
Figure 2:
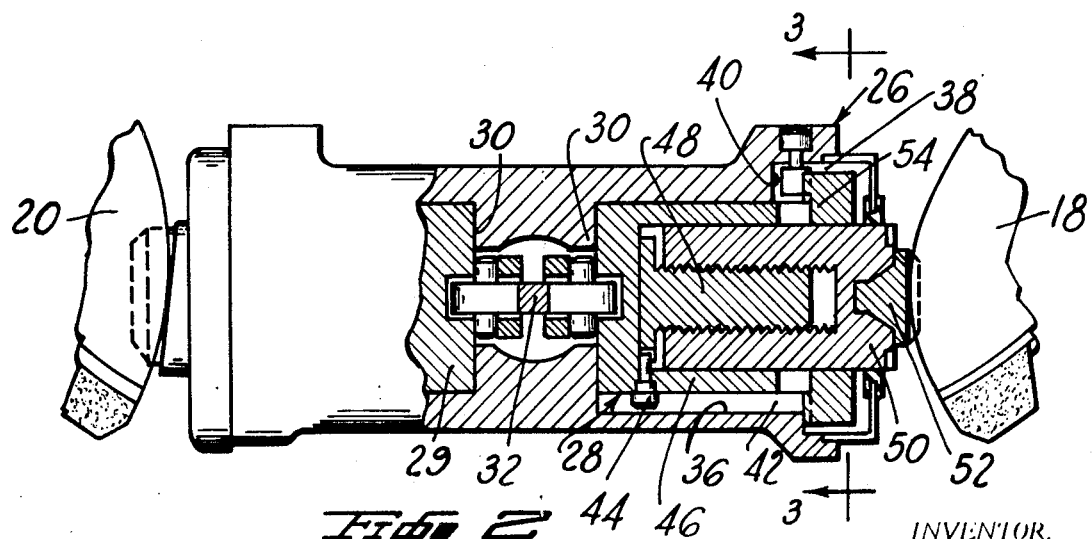
FIG. 2 is a partial cross-sectional view of the actuator and adjusting mechanism of the brake assembly of FIG. 1, which is illustrated in the shoe retracted position.
Figure 3:
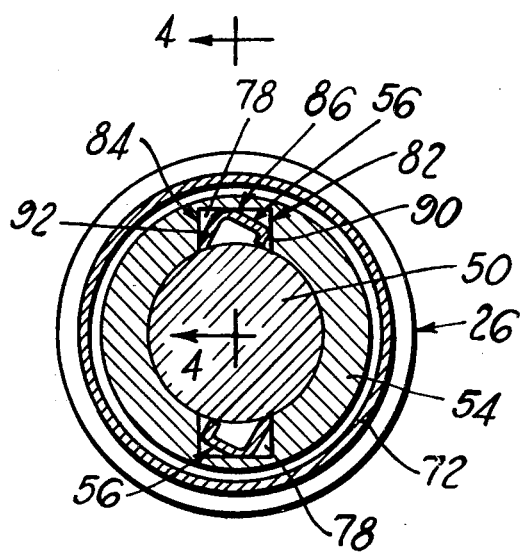
FIG. 3 is an enlarged cross-sectional view taken substantially along line 3—3 of FIG. 2.
Figure 4:
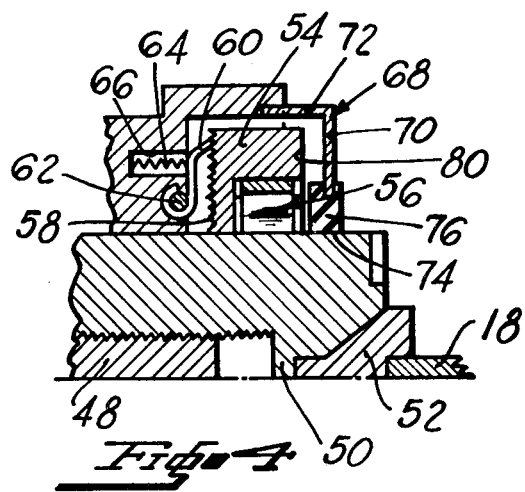
FIG. 4 is an enlarged, fragmentary cross-sectional view taken along line 4—4 of FIG. 3.
Figure 5:
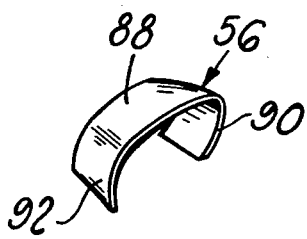
FIG. 5 is a perspective view of a clutch spring used in my present invention.

Referring now to the drawings, brake assembly 10 includes a drum 12 mounted for rotation with a wheel (not shown) to be braked. A torque spider 14 is adapted to be mounted on a stationary part of a vehicle, such as an axial flange, by inserting bolts (not shown) through the circumferentially spaced openings 16. A pair of brake shoes 18 and 20, respectively, are yieldably biased toward supporting ledges 22 by a pair of holddown springs 24. Torque spider 14 further includes a pair of diametrically opposed cylindrical housings 26 formed integrally therewith, each of which contains a slidable plunger assembly 28 and a slidable plunger 29. A pair of anchor flanges 30 are located within each cylindrical housing. The plunger assembly 28 and the plunger 29 each abut the corresponding anchor flange 30 when the brake is released and either the plunger assembly 28 or plunger 29 anchors on its corresponding anchor flange 30 during braking application, depending upon the direction of drum rotation. The plunger assembly 28 and plunger 29 are spread apart by a wedge member 32 during brake actuation. The wedge member 32 may be of any well-known design such as that illustrated in U.S. Pat. No. 2,527,126, owned by the assignee of the present invention. A pair of shoe return springs 34 returns the shoes and thereby the plunger and plunger assemblies to their released position.

Each housing assembly 26 defines a bore 36 therewithin having an open end 38. Bore 36 is enlarged at the open end 38 to present a stepped recess 40. Bore 36 is further slotted to provide a guide channel 42 that receives a guide screw 44 that engages the plunger assembly 28 to prevent the latter from turning in the bore. Plunger assembly 28 includes a hollow plunger sleeve 46 that carries a first member or adjuster screw 48 that is held against rotation relative to the sleeve 46 by the pin 44. Screw 48 threadedly engages a second member or adjuster nut 50 which rotates relative to the screw 38, and rotatably receives a coupling fixture 52 that couples the brake shoe 18 to the adjuster nut 50.

A flange 54 circumscribes the nut 50 and is held in driving engagement therewith by the springs 56. A set of ratchet teeth 58 extend from the lower surface of the flange 54 and are drivingly engaged by the adjusting pawl 60. Pawl 60 is pivotally secured to the housing 26 by a rod 62 extending through the wall thereof. A spring 64 is received in the cavity 66 in the housing 26 and yieldably urges the pawl 60 into driving engagement with the ratchet teeth 58. An L-shaped retainer 68 has a pair of mutually perpendicular legs 70 and 72. The retainer 68 is annular and circumscribes the open end 38 of the bore 36, overlying the path of travel of the flange 54. The leg 72 is secured to the housing 26, and the leg 70 is provided with a central aperture 74 through which the adjuster nut 50 travels. A resilient annular member 76 that sealingly and slidingly engages the adjuster nut 50 is carried by the leg 70.

The springs 56 are disposed in rectangular recesses 78 that are provided about the inner periphery of the flange 54 adjacent the nut 50. Each of the recesses 78 has an open upper surface 80 and a bottom surface closed by a portion 81 of the flange 54. Recesses 78 are further defined by a pair of sidewalls 82, 84 and a rear wall 86. Each spring 56 has a bight 88 that presents a pair of legs 90 and 92. Springs 56 are disposed in the recesses 78 such that the bights 88 engage the rear walls 86 and the sidewalls 82 and extends across the juncture therebetween. Legs 90, which are substantially shorter than the other legs 92, extend from the walls 82 to engage the second member or nut 50 at an angle with respect thereto. Similarly, the other legs 92 extend from the rear walls 86 to engage the member 50 at an angle substantially the same as that formed by the leg 90 and the member 50.

MODE OF OPERATION

In operation, assuming rotation of the drum in the direction of the arrow A, actuation of the wedge 32 will spread the plunger assembly 28 and the plunger 29 apart with the shoes 18 and 20 anchoring on the flanges 30 through the plunger 29. Flange 54 initially moves outwardly with the member 50, legs 90 and 92 precluding relative axial movement between the member and the flange. Upon contact of the flange 54 with leg 70 of the retainer 68, the flange 54 is prevented from moving further with the nut 50, the spring force exerted by the legs 90 and 92 being low enough to be easily overcome by the engagement of the flange with the leg 70. The distance of axial movement of the flange 54 with the nut 50, however, is great enough to allow the pawl 60, which follows the movement of the flange 54 due to the biasing action of the spring 64, to pick up the next ratchet tooth 58 on the lower surface of the flange 54. Upon release of the brake, the plunger assembly 26 returns to its released position abutting the anchoring flange 30. The pawl 60 having engaged the next one of the ratchet teeth 58, return movement of the plunger assembly 26 will cause the pawl to incrementally rotate the flange 54. Flange 54 returns with the nut 50 until it engages the stepped recess 40, whereupon nut 50 moves axially with respect to the flange 54. Because the engagement of the legs 90 and 92 with the nut 50 normally precludes relative rotation between the nut 54 and 50, this incremental rotation of the nut will also rotate the nut 50 which will extend the same incrementally axially of the housing 26, due to the threaded engagement between the adjuster nut 50 and the adjuster screw 48. However, under certain conditions, the brake shoes 18 and 20 apply an axial force to the nut 50 and member 48 locking the threads therebetween and thus precluding relative rotation therebetween. If compensation is not made for this condition, known as "kickback," return movement of the plunger with the members 48 and 50 locked against rotation would destroy the ratchet teeth 58 of flange 54, the pawl 60 and the spring 64. For this reason, the springs 56 are designed so that if the members 48 and 50 are locked against rotation, the force applied by the pawl 60 will override the biasing force of the legs 90 and 92 tending to prevent relative rotation between the flange 54 and nut 50 to permit relative rotation between these two members, thereby preventing destruction of the adjuster mechanism.

Of course, adjustment only takes place when the plunger assembly 28 moves a sufficient axial distance due to wear of friction material on the shoes 18 and 20 that the flange contacts the retainer 68. The leg 70 of retainer 68 is positioned such that the flange moves axially with the plunger an amount just sufficient to permit the adjusting pawl to pick up a new ratchet tooth. If the flange is not required to move sufficiently to contact this leg 70, adjustment will therefore not take place. Although adjustment cannot take place if the members 48 and 50 are locked together during kickback forces, no harm is done, since on the next normal braking application the brakes will be adjusted a compensating amount. In fact, it is desirable that adjustment not take place when kickback forces lock the members 48 and 50 against relative rotation, since kickback forces most often occur during a sudden application of the brakes. This sudden application of the brakes compresses the friction material against the drum, causing the plunger to move axially a distance greater than normal. If adjustment did take place under these circumstances, the friction linings might be moved too close to the drum 12.

Thus, it can be seen that the instant invention provides significant advantages over prior art devices. The adjuster nut 50, flange 54, and springs 56 are of extremely simple design and may be easily fabricated and assembled. Since there are no screw threads on the outer surface of the member 50, as was necessary in prior art devices, the seal 76 always has a smooth surface to seal against, even though repeated brake adjustments have caused the nut 50 to extend a substantial distance from the housing 26. Since the seal 76 is carried by the metal retainer 68, a smaller and less exposed seal is provided over that available in prior art devices. The springs 86 are so shaped and installed in their recesses 78 that "kickback" energy is absorbed without harmful deformation of the springs themselves since the member 50 can rotate past the legs 90 and 92.

I claim:

1. In a brake having a pair of shoes engageable with a rotatable drum;
   a housing having a bore therein with an open end;
   a plunger assembly slidable in said bore for movement relative to the housing in a brake applying direction and in a return direction, said plunger assembly having a first member held against rotation and a second member rotatably engaging said first member and one of said shoes;
   a flange circumscribing said second member with a plurality of recesses in said flange adjacent said second member;
   drive means for incrementally rotating said flange in one direction upon movement of the plunger assembly in the return direction; and
   resilient means disposed in each of said recesses for interconnecting said flange and said second member normally precluding relative rotation therebetween but permitting relative rotation upon locking of said first and second members against relative rotation.

2. The invention of claim 1; and
   stop means secured to said housing and surrounding said second member for axially limiting the movement of said flange in said brake applying direction.

3. The invention of claim 2:
   said resilient means precluding relative axial movement between said flange and said second member upon movement of said plunger assembly in the brake applying direction until said flange engages said stop member whereupon said resilient means permits said second member to extend axially from said flange.

4. The invention of claim 2:
   said stop means being an annular retainer presenting a pair of mutually perpendicular legs;
   one of said legs being secured to the housing;
   the other leg overlying said flange;
   said flange engaging said other leg upon actuation of the plunger.

5. The invention of claim 4:
   said other leg supporting a resilient annular member slidingly engaging said second member.

6. The invention of claim 2:
   said stop means carrying a resilient member slidingly engaging said second member.

7. The invention of claim 1:
   said plunger assembly including a hollow sleeve carrying said first and second members;
   said first member being a threaded post secured against rotation in said sleeve;
   said second member being a nut threadedly engaging said post.

8. The invention of claim 7:
   said nut rotatably receiving a coupling for securing said one shoe to the nut.

9. The invention of claim 1:
   said resilient member being a sprag spring having a bight presenting a pair of legs;
   said bight engaging the walls of said recess;
   said legs engaging said second member.

10. The invention of claim 9:
    said recess having a rear wall and a pair of sidewalls;
    one of said legs being substantially shorter than the other leg;
    said bight engaging said rear wall and one of said sidewalls and extending across the juncture therebetween;
    said one leg and said other leg extending from said one wall and said rear wall respectively to engage said second member at an angle with respect thereto.

11. In a brake having a pair of shoes engageable with a rotatable drum:
    a housing defining a bore therewithin having an open end;
    a plunger assembly slidable in said bore in a brake applying direction and in a return direction;
    said plunger assembly including a first member held against rotation and a second member threadedly engaging said first member and receiving one of said shoes;
    there being a flange circumscribing said second member;
    drive means engaging the flange to incrementally rotate the latter in one direction upon movement of the plunger assembly in the return direction;
    said flange carrying a resilient member having a pair of legs engaging said second member; and
    stop means carried by the housing overlying the path of travel of said plunger assembly;
    said legs securing said flange to the second member during movement of the latter in the brake applying direction until the flange engages the stop means, whereupon said legs permit said second member to extend with respect to the flange.

12. The invention of claim 11
    said stop means being an annular retainer having a pair of mutually perpendicular legs;
    one of said legs being secured to the housing;
    the other leg overlying the path of travel of the plunger assembly;
    said other leg carrying resilient means sealingly engaging the second member